(12) United States Patent
King

(10) Patent No.: US 12,495,746 B2
(45) Date of Patent: Dec. 16, 2025

(54) LANDSCAPE EDGING SYSTEM

(71) Applicant: Beuta LLC, Strasburg, PA (US)

(72) Inventor: Mervin K. King, Strasburg, PA (US)

(73) Assignee: Beuta LLC, Strasburg, PA (US)

( * ) Notice: Subject to any disclaimer, the term of this patent is extended or adjusted under 35 U.S.C. 154(b) by 245 days.

(21) Appl. No.: 18/309,006

(22) Filed: Apr. 28, 2023

(65) Prior Publication Data

US 2024/0357976 A1 Oct. 31, 2024

(51) Int. Cl.
*A01G 9/28* (2018.01)
(52) U.S. Cl.
CPC ..................................... *A01G 9/28* (2018.02)
(58) Field of Classification Search
CPC ........ A01G 9/28; E01C 11/222; E02D 17/205
See application file for complete search history.

(56) References Cited

U.S. PATENT DOCUMENTS

| | | | | |
|---|---|---|---|---|
| 5,123,773 A | * | 6/1992 | Yodock | E01F 15/088 |
| | | | | 404/6 |
| 5,233,806 A | | 8/1993 | Hightower et al. | |
| 5,414,956 A | * | 5/1995 | Kheradpir | A01G 9/28 |
| | | | | 47/33 |
| 5,445,362 A | * | 8/1995 | Reppert | A01G 9/28 |
| | | | | 47/33 |
| 5,803,594 A | | 9/1998 | Fredrickson et al. | |
| 6,102,374 A | * | 8/2000 | Macri | A01G 9/28 |
| | | | | 47/33 |
| 6,643,977 B1 | * | 11/2003 | Drysdale | A01G 9/28 |
| | | | | 47/33 |
| 9,832,934 B2 | | 12/2017 | Riccobene et al. | |
| 9,974,240 B1 | | 5/2018 | Brinner et al. | |
| 10,358,785 B2 | | 7/2019 | Doman et al. | |
| 10,463,936 B1 | * | 11/2019 | Lanuti | A63B 67/02 |
| D958,413 S | * | 7/2022 | James | D25/113 |
| 2005/0028438 A1 | | 2/2005 | Campana | |

FOREIGN PATENT DOCUMENTS

| | | | | |
|---|---|---|---|---|
| CN | 204482439 U | | 7/2015 | |
| EP | 1081314 B1 | | 11/2005 | |
| GB | 2490133 A | * | 10/2012 | ............... A01G 1/08 |
| JP | 3139466 U | * | 2/2008 | ............. A01G 9/027 |
| KR | 20180016769 A | * | 2/2018 | |
| KR | 102148138 B1 | | 8/2020 | |
| KR | 102410390 B1 | | 6/2022 | |

* cited by examiner

*Primary Examiner* — Theodore V Adamos
(74) *Attorney, Agent, or Firm* — Barley Snyder

(57) ABSTRACT

A landscape edging system includes a first segment and a second segment connected to the first segment. The first segment includes at least one first block having a connector extending from an end face of the at least one first block. The connector has a connection segment and a flange at an end of the connection segment opposite the end face of the at least one first block. The second segment including at least one second block defining an interior space and having a mating opening extending through a side face or an end face of the at least one second block into the interior space. The connector is received in the mating opening and in the interior space to connect the first segment and the second segment.

20 Claims, 19 Drawing Sheets

US 12,495,746 B2

LANDSCAPE EDGING SYSTEM

FIELD OF THE INVENTION

The present invention relates to a landscape edging system and, more particularly, to a landscape edging system having a plurality of segments connectable together.

BACKGROUND

Edging of a landscape bed provides both an aesthetic improvement and a practical barrier that retains soil, plants, and other materials within a defined boundary. Typically, the edging of the landscape bed is formed by pieces of a hard, heavy material, such as a stone block or a brick, that are individually laid in place adjacent to one another in a desired arrangement. The constructor of the bed often must dig a trench, position each block or brick in place, and then fill around the blocks and bricks to hold them in place. The process of constructing the edging is thus time consuming and labor intensive. Further, the blocks and bricks that are not connected to one another can shift, requiring periodic adjustment and maintenance.

SUMMARY

A landscape edging system includes a first segment and a second segment connected to the first segment. The first segment includes at least one first block having a connector extending from an end face of the at least one first block. The connector has a connection segment and a flange at an end of the connection segment opposite the end face of the at least one first block. The second segment including at least one second block defining an interior space and having a mating opening extending through a side face or an end face of the at least one second block into the interior space. The connector is received in the mating opening and in the interior space to connect the first segment and the second segment.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
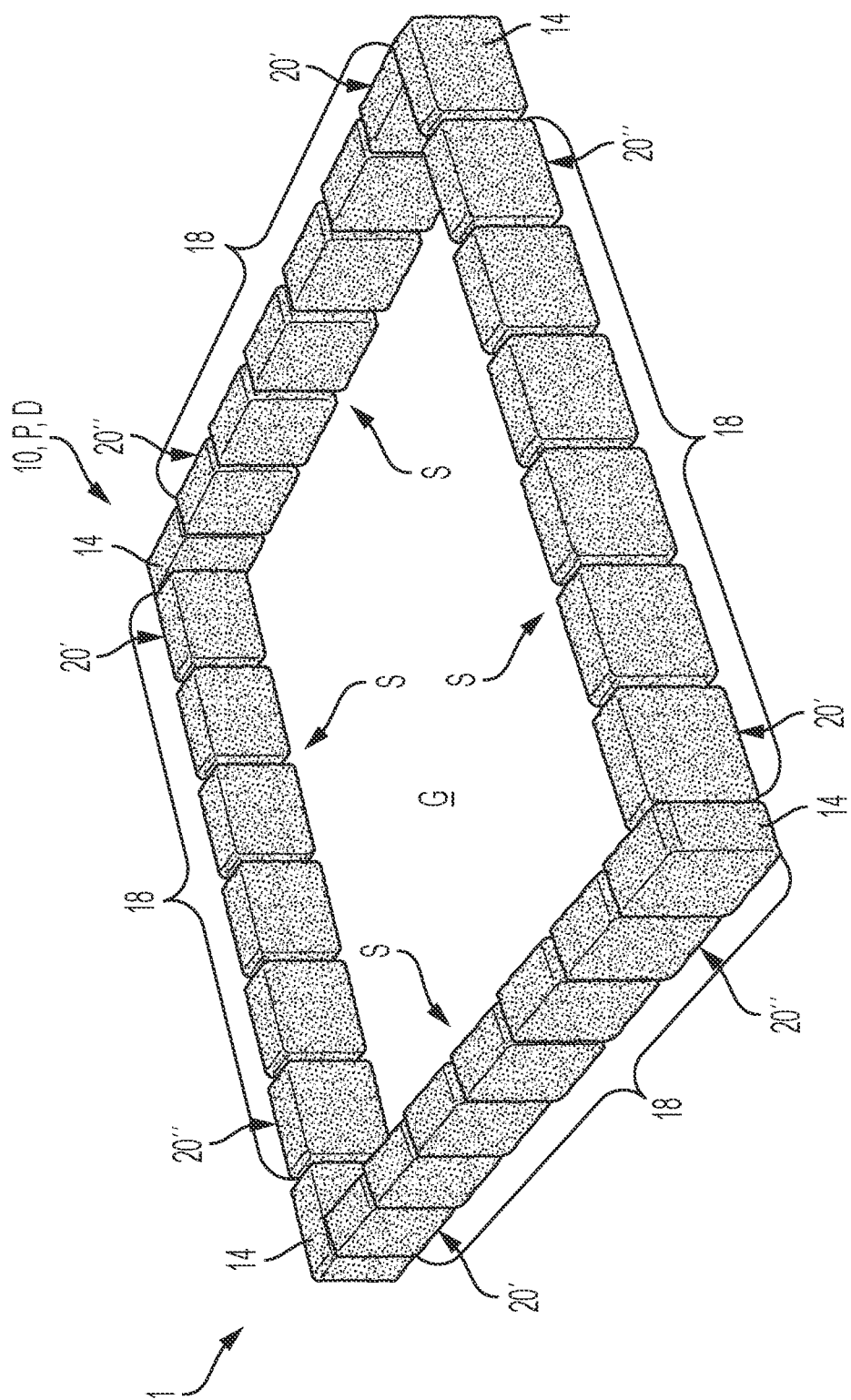
FIG. 1 is a perspective view of a landscape edging system according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art. In addition, in the following detailed description, for purposes of explanation, numerous specific details are set forth to provide a thorough understanding of the disclosed embodiments. However, it is apparent that one or more embodiments may also be implemented without these specific details.

Throughout the drawings, only one of a plurality of identical elements may be labeled in a figure for clarity of the drawings, but the detailed description of the element herein applies equally to each of the identically appearing elements in the figure. Throughout the specification, directional descriptors are used such as "longitudinal direction", "height direction", and "width direction". These descriptors are merely for clarity of the description and for differentiation of the various directions. These directional descriptors do not imply or require any particular orientation of the disclosed elements.

A landscape edging system 1 according to an embodiment is shown on a ground surface G in FIG. 1. The landscape edging system 1 includes a plurality of segments 10 that are connected together to form a perimeter shape P.

The segments 10 include six different types that are interchangeably connectable together: a start segment 11, an end segment 12, a right turn segment 14, a left turn segment 15, an extender segment 16, and a long section 18. The segments 10 differ from one another, as described in detail below, but share common components of a block 20, a connector 40, and a mating opening 50. The various types of segments 10 including the common components will be described first, followed by various resulting perimeter shapes P of landscape edging systems 1 according to different embodiments. Like reference numbers refer to like elements throughout the description.

The right turn segment 14 is shown in FIGS. 2A-2D. The right turn segment 14 includes a single block 20. The block 20 is an approximately cuboid shape having a first end face 22, a second end face 24 opposite the first end face 22 in a longitudinal direction L of the block 20, a first side face 26 extending along the longitudinal direction L between the first end face 22 and the second end face 24, and a second side face 28 parallel to the first side face 26 and spaced apart from the first side face 26 in a width direction W perpendicular to the longitudinal direction L. The block 20 has an upper surface 30 and a lower surface 34 opposite the upper surface 30 in a height direction H perpendicular to the longitudinal direction L and the width direction W.

In the shown embodiment, the block 20 is hollow and the faces 22, 24, 26, 28 and the surfaces 30, 34 of the block 20 define an open interior space 36. In an embodiment, the lower surface 34 is solid to define the interior space 36. In another embodiment, the lower surface 34 may be open to the interior space 36.

As shown in FIGS. 2A-2D, the block 20 has a textured surface 39 on the faces 22, 24, 26, 28 and the upper surface 30 of the block 20. The textured surface 39 resembles a natural stone texture; the faces 22, 24, 26, 28 and the upper surface 30 are not perfectly straight or uniformly planar, but have a rough surface finish and topography resembling stone.

Figure 2A:
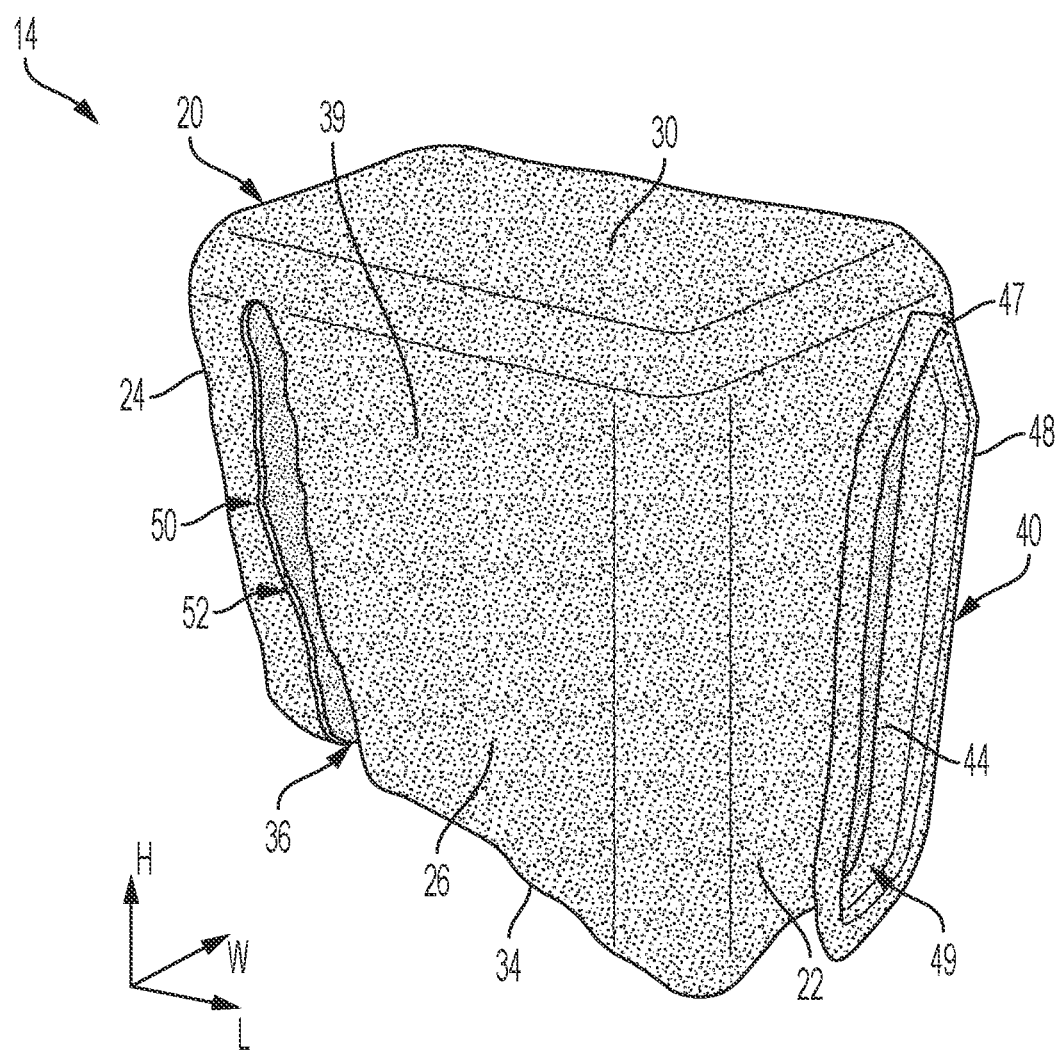
FIG. 2A is a front perspective view of a right turn segment of the landscape edging system.
Figure 2B:
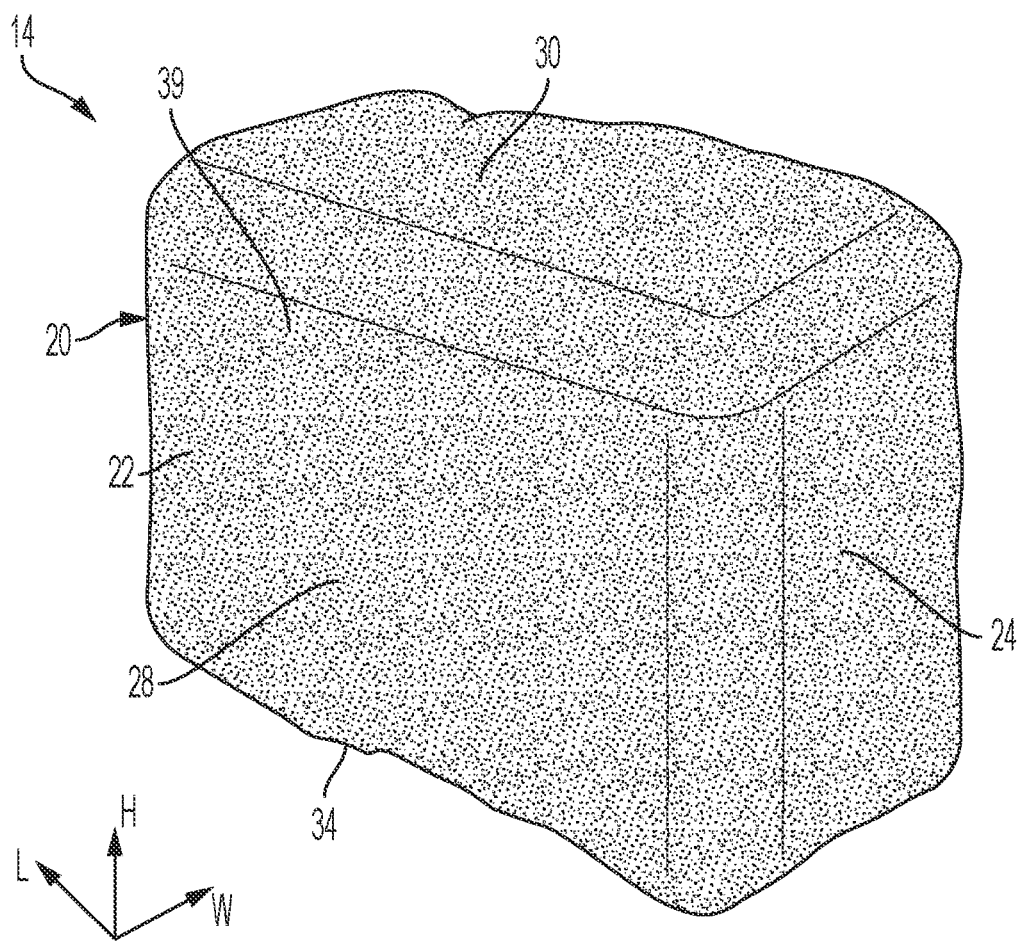
FIG. 2B is a rear perspective view of the right turn segment.
Figure 2C:
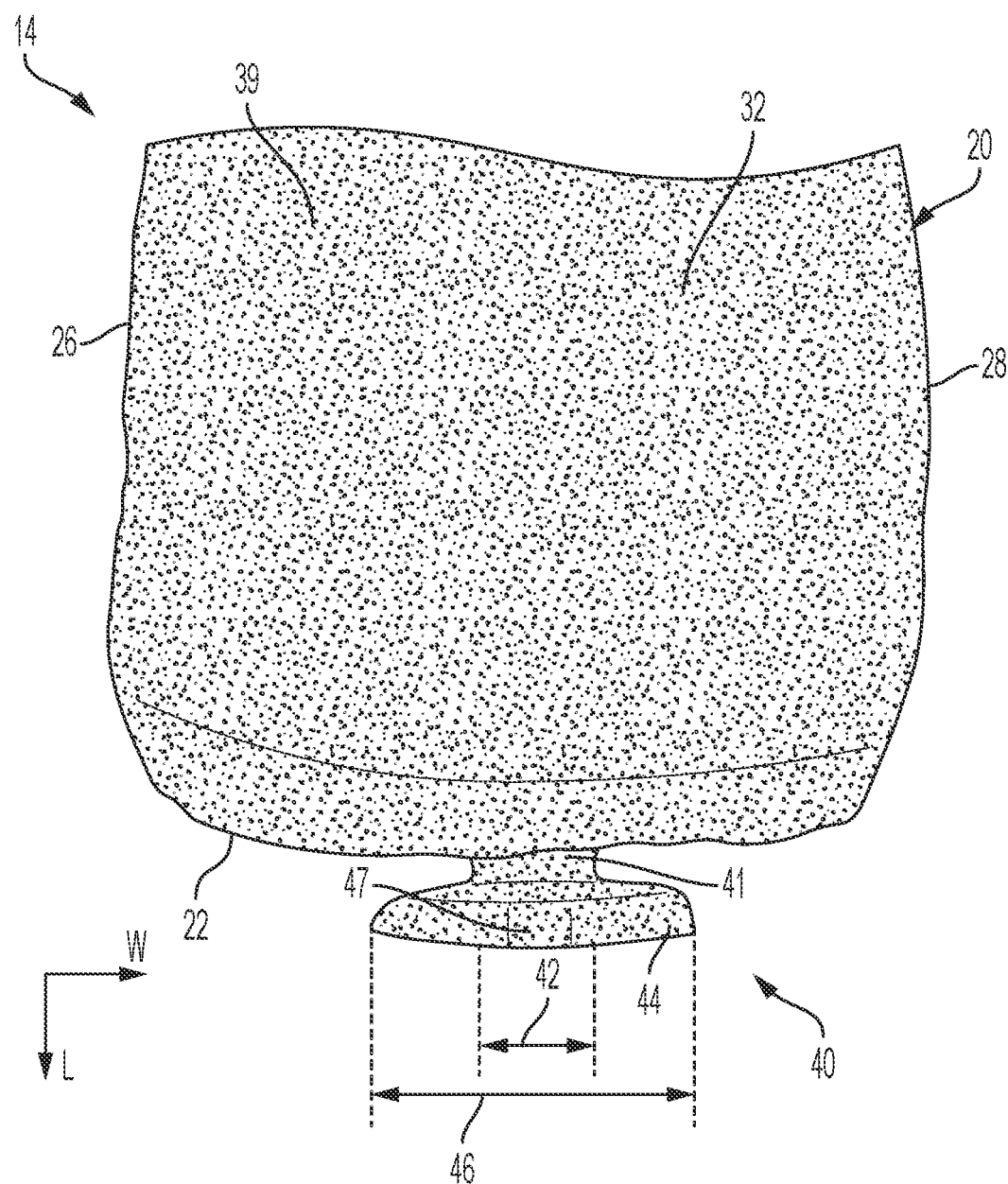
FIG. 2C is a top view of a portion of the right turn segment.
Figure 2D:
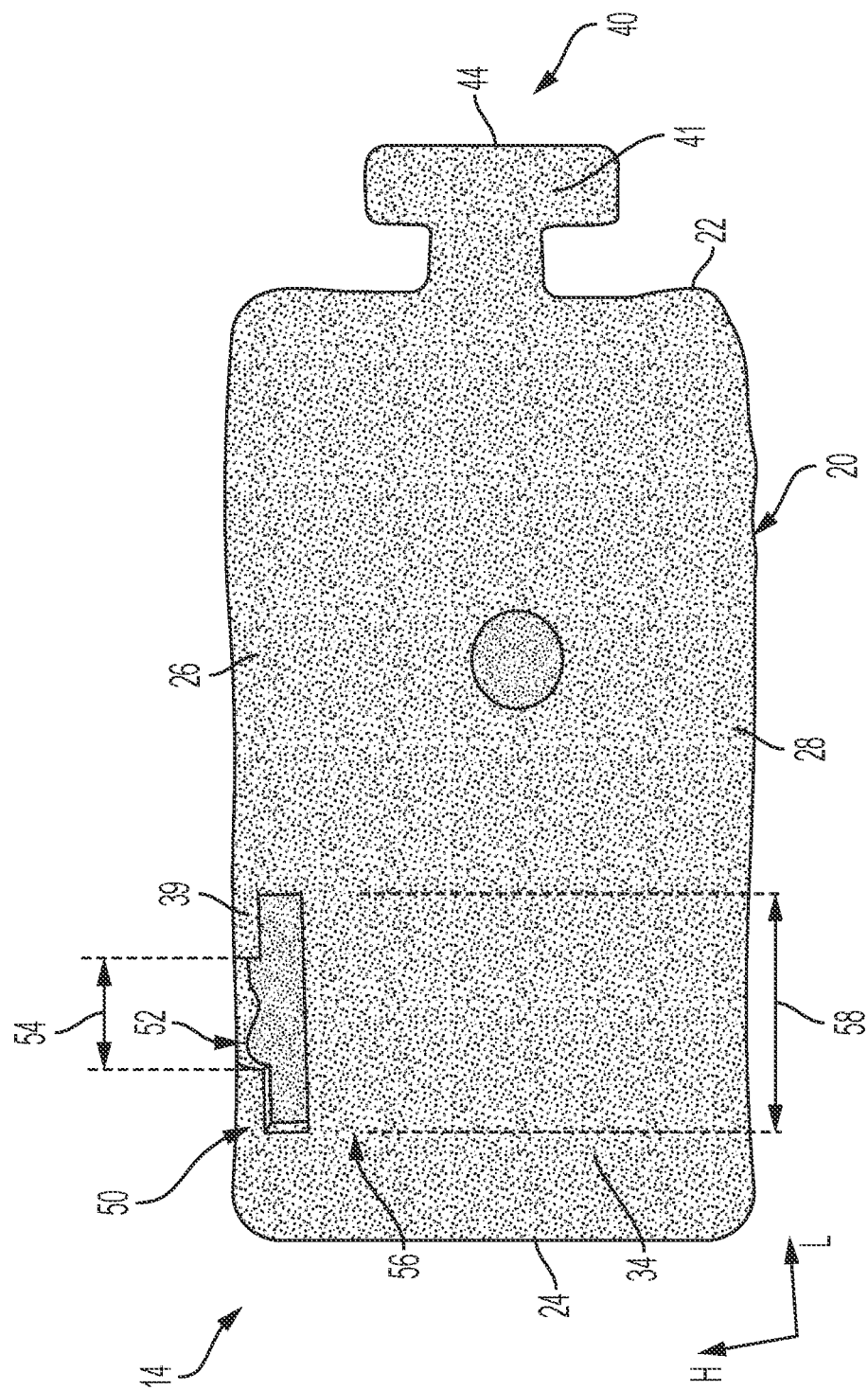
FIG. 2D is a bottom view of the right turn segment.

The right turn segment 14 has a connector 40 extending from the first end face 22 of the block 20, as shown in FIGS. 2A, 2C, and 2D. The connector 40 has a connection segment 41 and a flange 44 at an end of the connection segment 41 opposite the first end face 22 of the block 20. As shown in FIG. 2C, the connection segment 41 has a connection width 42 in the width direction W and the flange 44 has a flange width 46 in the width direction W. The flange width 46 is greater than the connection width 41. As shown in FIG. 2A, the flange 44 has a tapered end 47 in the height direction H adjacent to the upper surface 30 of the block 20. In the shown embodiment, the flange 44 has a lip 48 at an outer edge of the flange 44 for increased strength. In another embodiment, the lip 48 of the flange 44 can be omitted. The connector 40 has a connection opening 49 extending through the connection segment 41 and the flange 44 in the longitudinal direction L into the interior space 36 of the block 20.

As shown in FIGS. 2A and 2D, the right turn segment 14 has a mating opening 50 extending through the first side face 26 and into the interior space 36 of the block 20 along the width direction W. The mating opening 50 has a primary recess 52 and a bottom recess 56 communicating with the primary recess 52. In the right turn segment 14 shown in FIGS. 2A and 2D, the primary recess 52 extends through the first side face 26 of the block 20 and the bottom recess 56 extends through the lower surface 34 of the block 20. The primary recess 52 has a primary width 54 in the longitudinal direction L and the bottom recess 56 has a bottom width 58 in the longitudinal direction L. The bottom width 58 is greater than the primary width 54.

Figure 3:
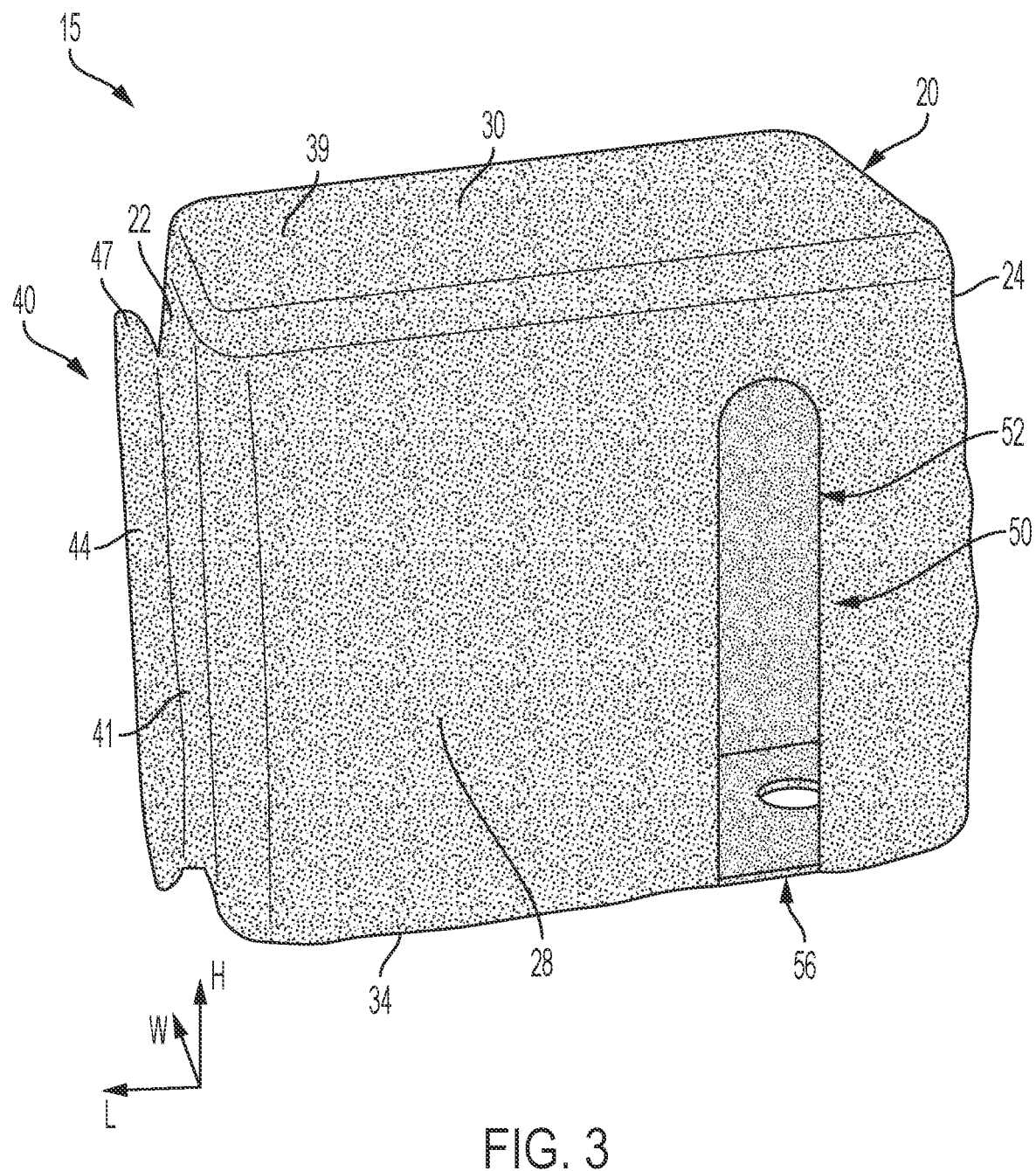
FIG. 3 is a perspective view of a left turn segment of the landscape edging system.

Another one of the segments 10 of the landscape edging system 1, the left turn segment 15, is shown in FIG. 3. The left turn segment 15 has the single block 20 and the connector 40 extending from the first end face 22 of the block 20, like the right turn segment 14, but unlike the right turn segment 14 has the mating opening 50 on the second side face 28 of the block 20 instead of the first side face 26.

Figure 4:
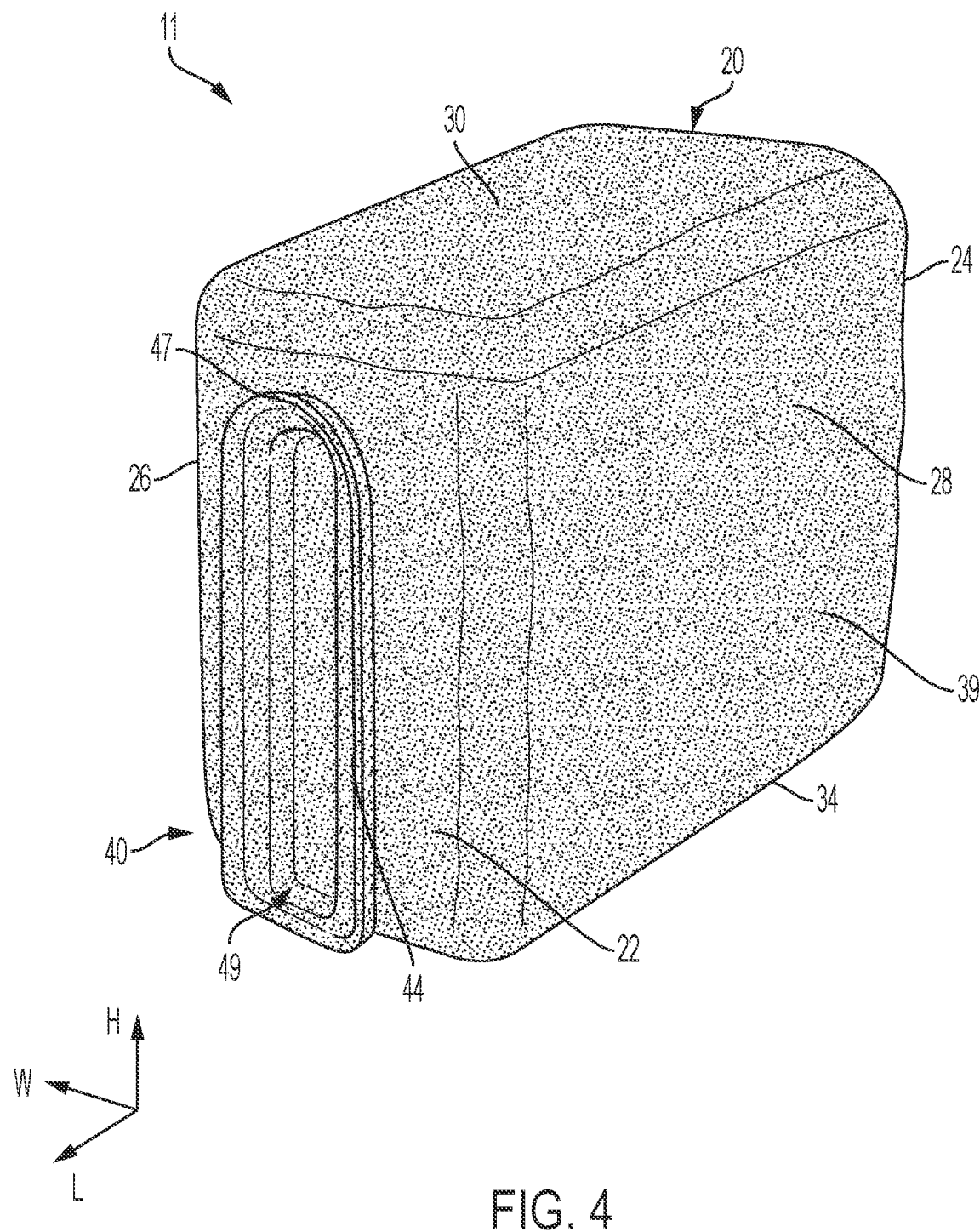
FIG. 4 is a perspective view of a start segment of the landscape edging system.

The start segment 11 of the segments 10 is shown in FIG. 4. The start segment 11 has the single block 20 and the connector 40 extending from the first end face 22 of the single block 20 like the right turn segment 14 and the left turn segment 15, but does not have the mating opening 50. The second end face 24, the first side face 26, and the second side face 28 are solid in the start segment 11.

Figure 5:
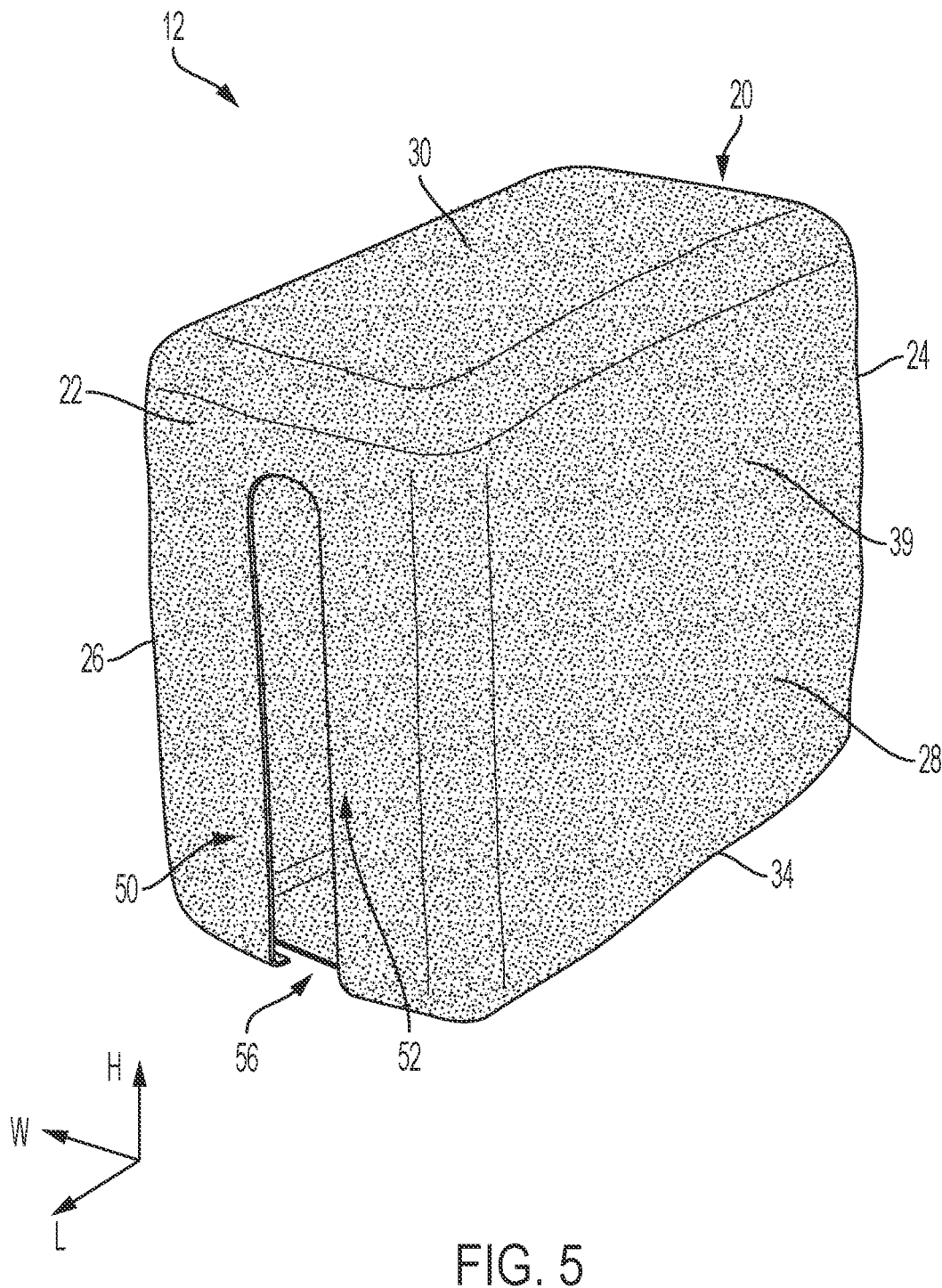
FIG. 5 is a perspective view of an end segment of the landscape edging system.

The end segment 12 of the segments 10 is shown in FIG. 5. The end segment 12 has the single block 20 but has the mating opening 50 extending into the first end face 22. The end segment 12 does not have the connector 40. The second end face 24, the first side face 26, and the second side face 28 are solid in the end segment 12.

Figure 6B:
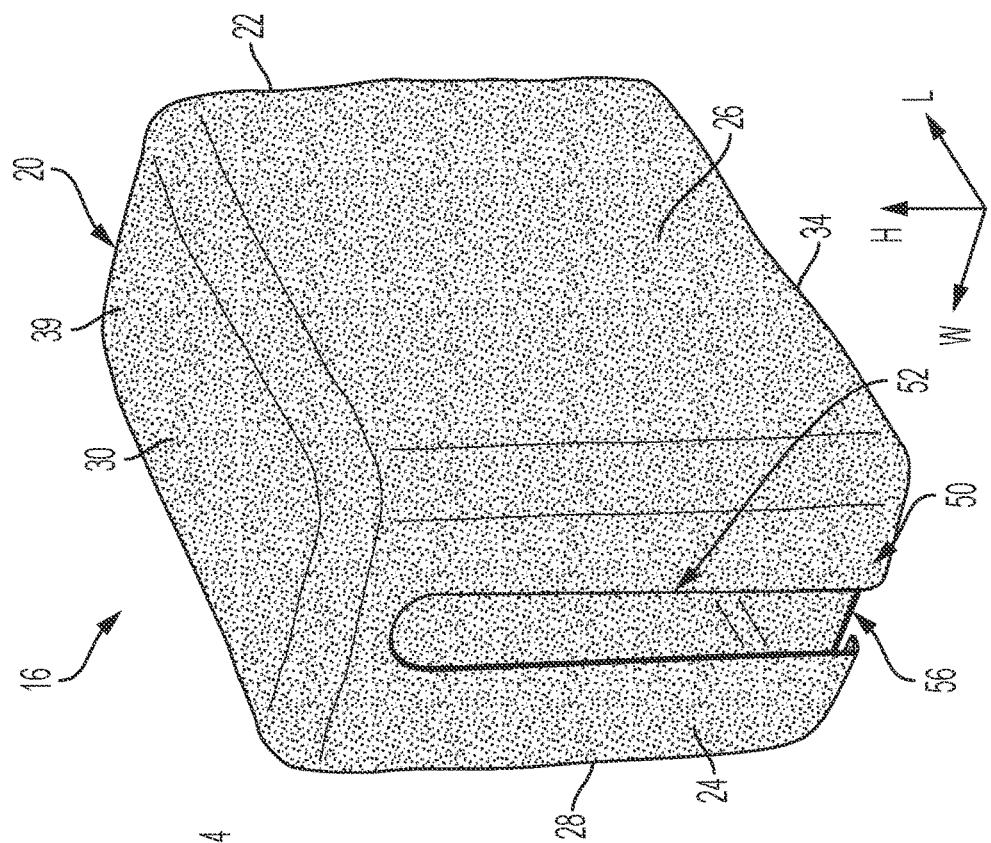
FIG. 6B is a rear perspective view of the extender segment.
Figure 6A:
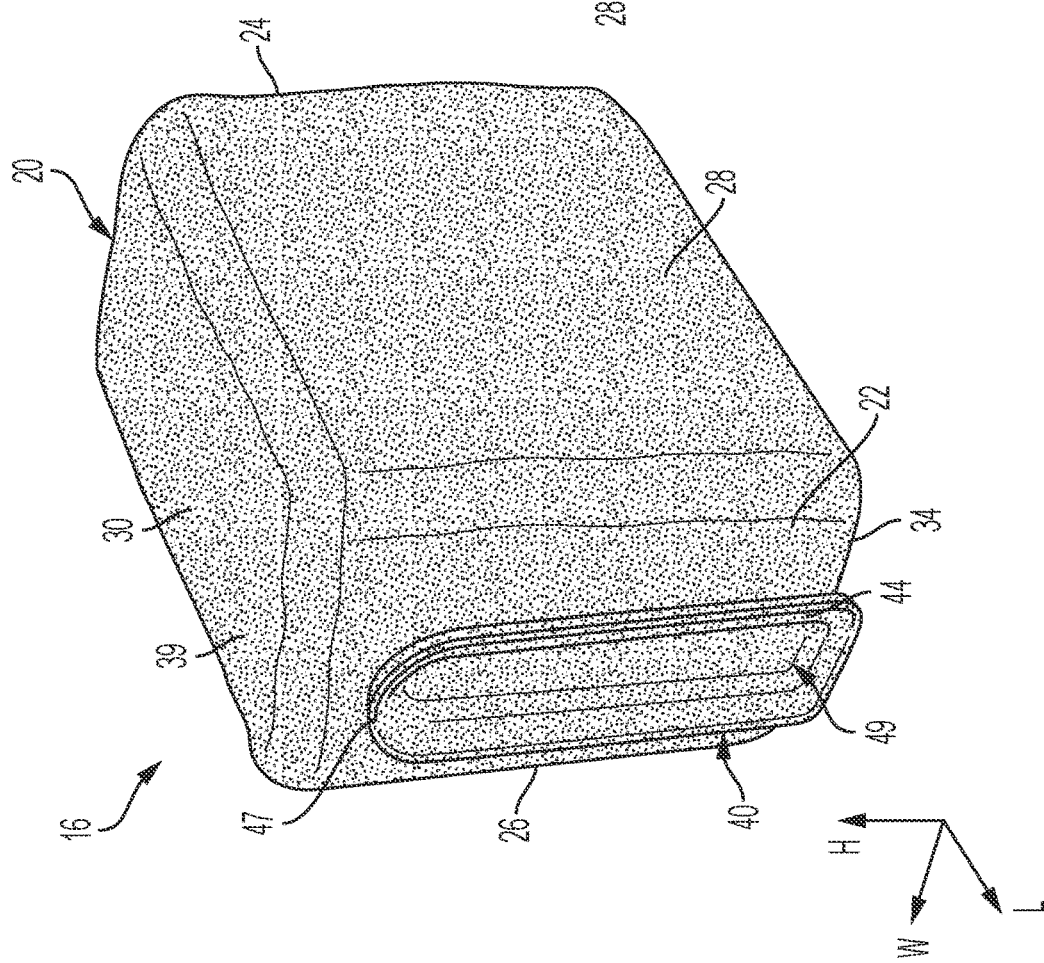
FIG. 6A is a front perspective view of an extender segment of the landscape edging system.

Another one of the segments 10 of the landscape edging system 1, the extender segment 16, is shown in FIGS. 6A and 6B. The extender segment 16 has the single block 20, the connector 40 extending from the first end face 22 of the block 20, and the mating opening 50 extending into the second end face 24 of the block 20. The first side face 26 and the second side face 28 are solid in the extender segment 16.

Figure 7A:
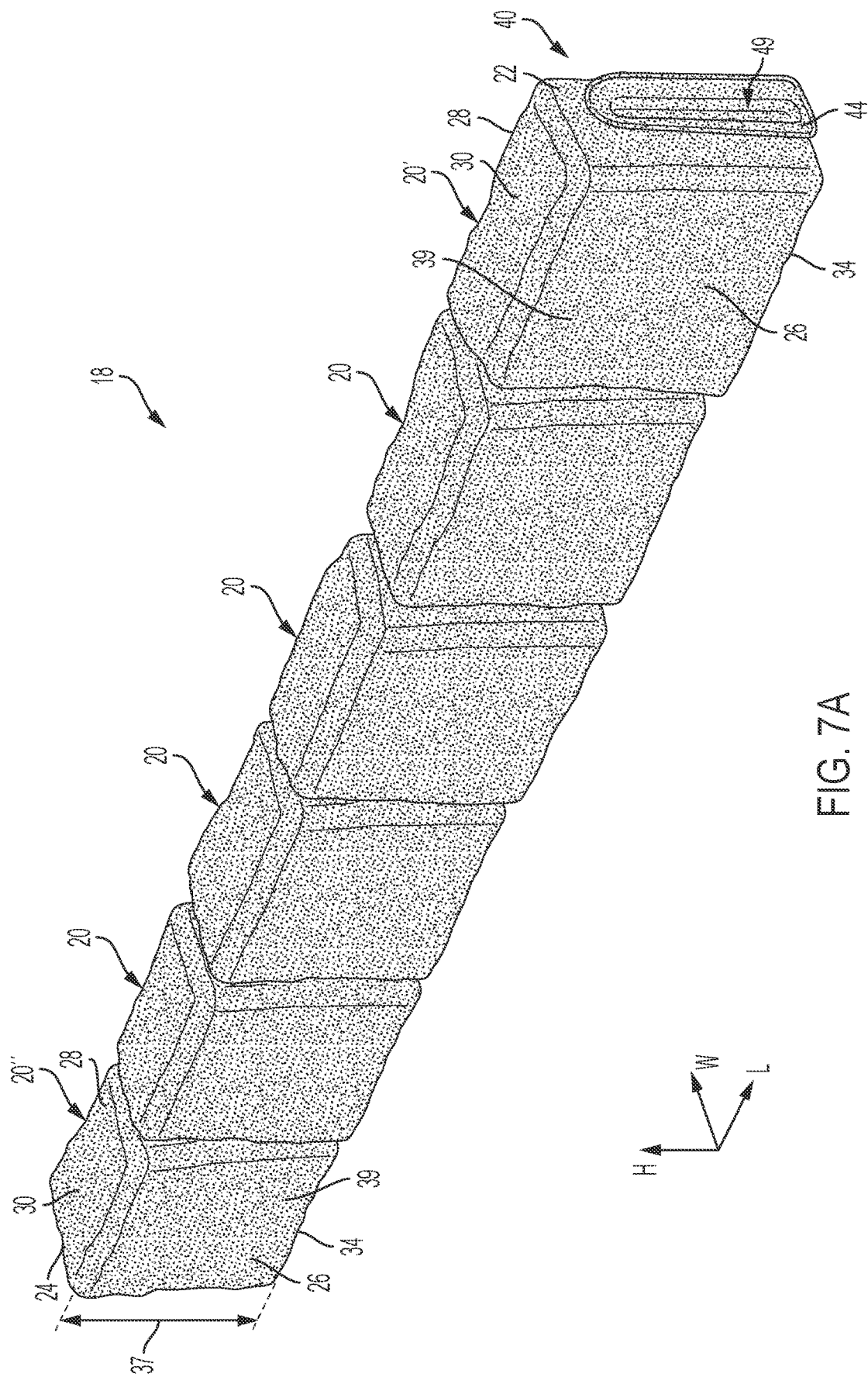
FIG. 7A is a perspective view of a long section of the landscape edging system.
Figure 7B:
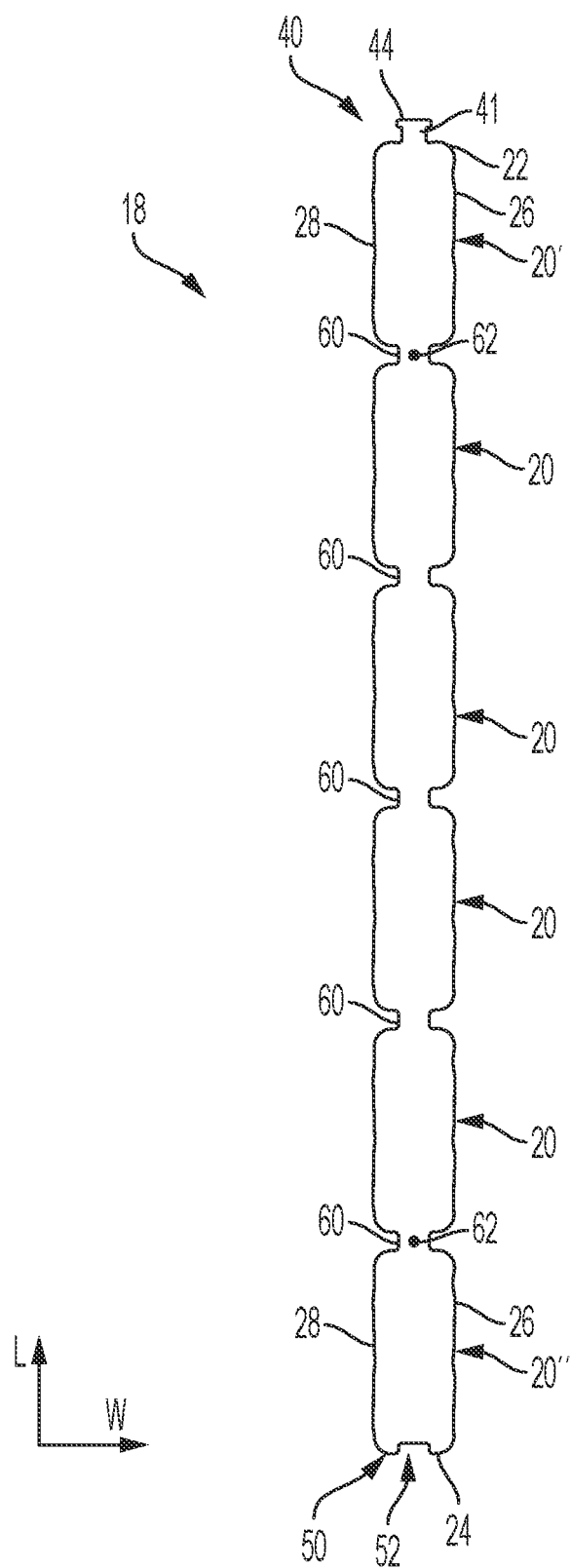
FIG. 7B is a top view of the long section.
Figure 7C:
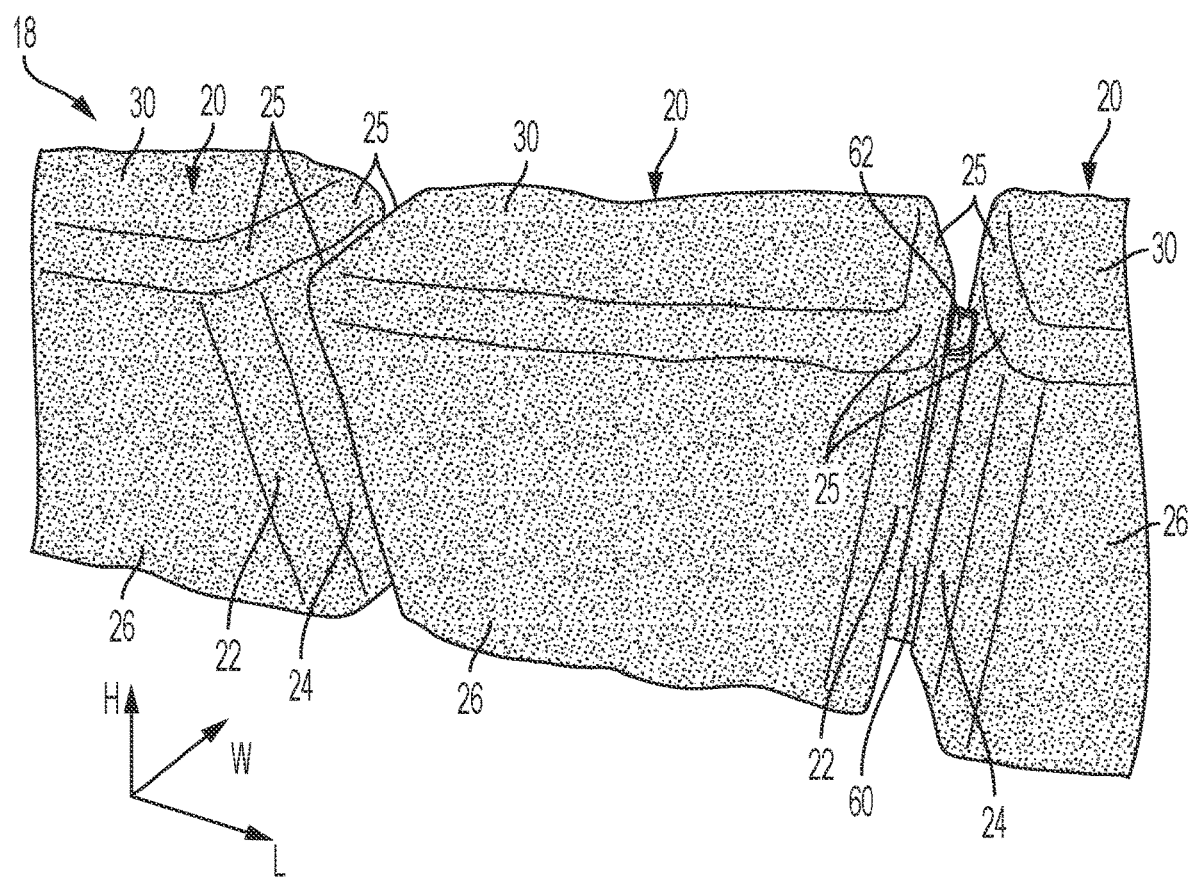
FIG. 7C is a detail perspective view of a portion of the long section.

The long section 18 of the segments 10 is shown in FIGS. 7A-7C. The long section 18 has a plurality of blocks 20 connected together by a plurality of joints 60. Each of the joints 60 is positioned between two adjacent blocks 20. The long section 18, in an embodiment, is monolithically formed in a single piece including the blocks 20 and the joints 60.

In the embodiment shown in FIG. 7A-7C, the long section 18 includes six blocks 20 formed as described above with five joints 60 between the blocks 20. In other embodiments, the long section 18 may include any number of blocks 20. The blocks 20 of the long section 18 are connected by a number of joints 60 that is one less than the number of blocks 20. For clarity of the description, a block 20 at a one end of the long section 18 will be referred to as a first end block 20' and a block 20 at an opposite end of the long section 18 will be referred to as a second end block 20".

The first end block 20' of the long section 18 has the connector 40 on the first end face 22, as shown in FIGS. 7A and 7B. The second end block 20" has the mating opening 50 on the second end face 24. The remainder of the end faces 22, 24 of the blocks 20 in the long section 18 are connected to the joints 60. The side faces 26, 28 of the blocks 20 in the long section 18 are solid and do not have the connector 40 or the mating opening 50.

The joints 60 between the blocks 20, shown most clearly in FIG. 7B, are formed of the same lightweight, rigid material as the blocks 20 but are sufficiently thin to be flexible. As described in greater detail below, the blocks 20 are elastically bendable with respect to one another about the joints 60; the axis of bending extends along the height direction H. At least one of the joints 60 has a passageway 62, as shown in FIG. 7B, extending through the joint 60.

As shown in detail in FIG. 7C, an end face 22, 24 of each of the blocks 20 connected to one of the joints 60 has a pair of angled surfaces 25 that are angled away from the one of the joints 60. The angled surfaces 25 allow the blocks 20 to resiliently bend to a greater degree about the joints 60 without contacting one another.

In an embodiment, all of the segments 10 are monolithically formed in a single piece from a lightweight, rigid material, such as a low-density polyethylene. In another embodiment, the segments 10 can each be formed from a plurality of separate elements formed of the lightweight, rigid material that are attachable to together to form the segments 10 described above. In an embodiment, the segments 10 are each molded in the single piece from the lightweight, rigid material.

Figure 8:
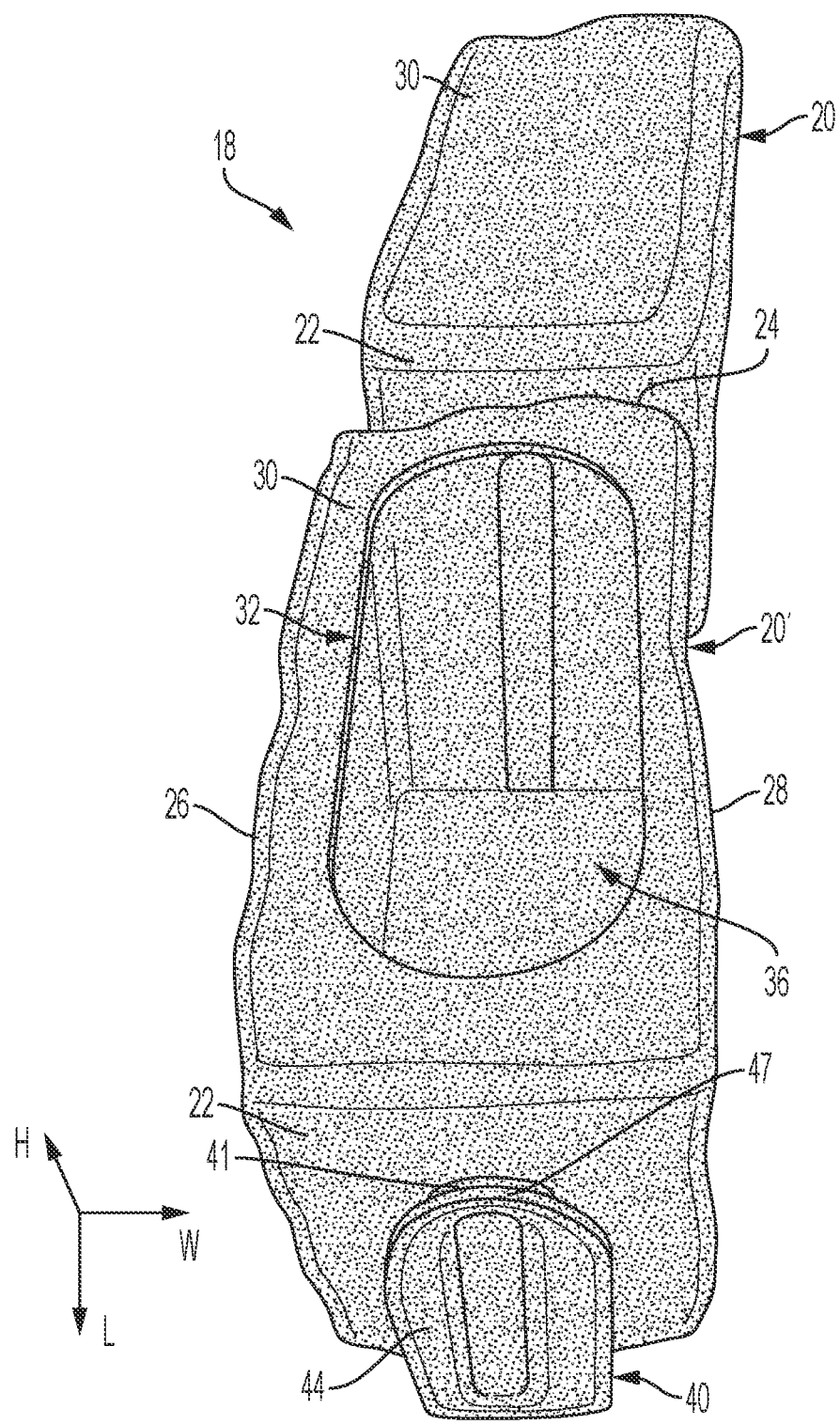
FIG. 8 is a perspective view of a portion of a long section according to another embodiment.

In another embodiment shown in FIG. 8, one of the blocks 20 has a top opening 32 extending through the upper surface 30 of the block 20 in the height direction H and into the interior space 36 of the block 20. The top opening 32 can be used, for example, to receive a flower, another planting, or any other item that can be displayed or stored in the block 20. Although FIG. 8 shows the top opening 32 in the upper surface 30 of the first end block 20' of the long section 18, in other embodiments, the top opening 32 could be in the upper surface 30 of any of the blocks 20 of any of the segments 10 of the landscape edging system 1.

Figure 9:
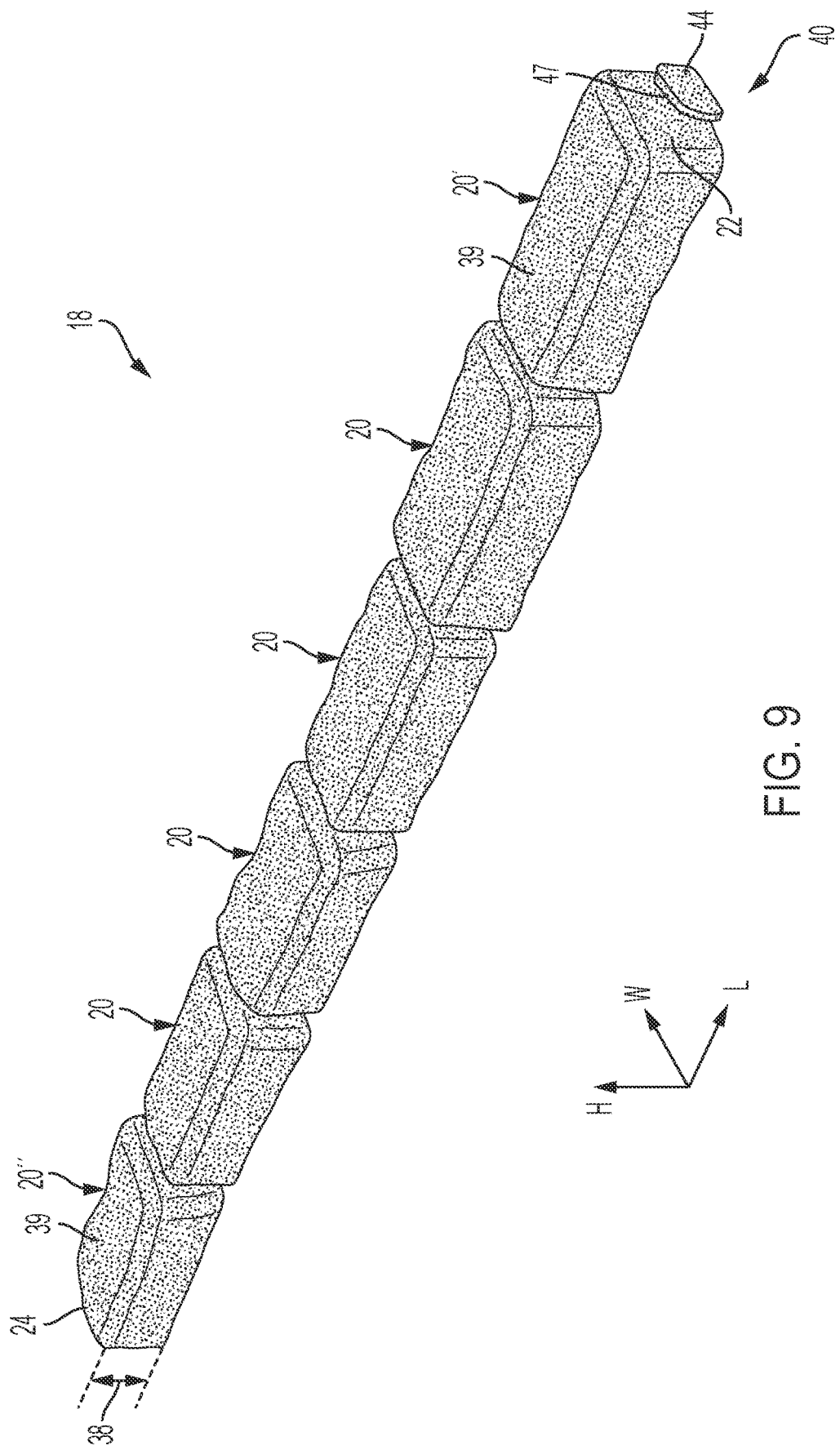
FIG. 9 is a perspective view of a long section according to another embodiment.

A plurality of blocks 20 according to another embodiment are shown in FIG. 9. The blocks 20 in the embodiment of FIGS. 1-8, as shown in FIG. 7A, have a first height 37 in the height direction H. The blocks 20 in the embodiment of FIG. 9 have a second height 38 in the height direction H that is less than the first height 37. In an embodiment, the second height 38 is less than half of the first height 37. The other dimensions and features of the blocks 20, the connector 40, the mating opening 50, and the joints 60 remain the same as in the embodiment of FIGS. 1-8. The blocks 20 having the second height 38 may, for example, resemble a brick shape. Although the blocks 20 having the second height 38 are shown in FIG. 9 as part of the long section 18, the blocks 20 of any of the segments 10 could have the second height 38.

Figure 10:
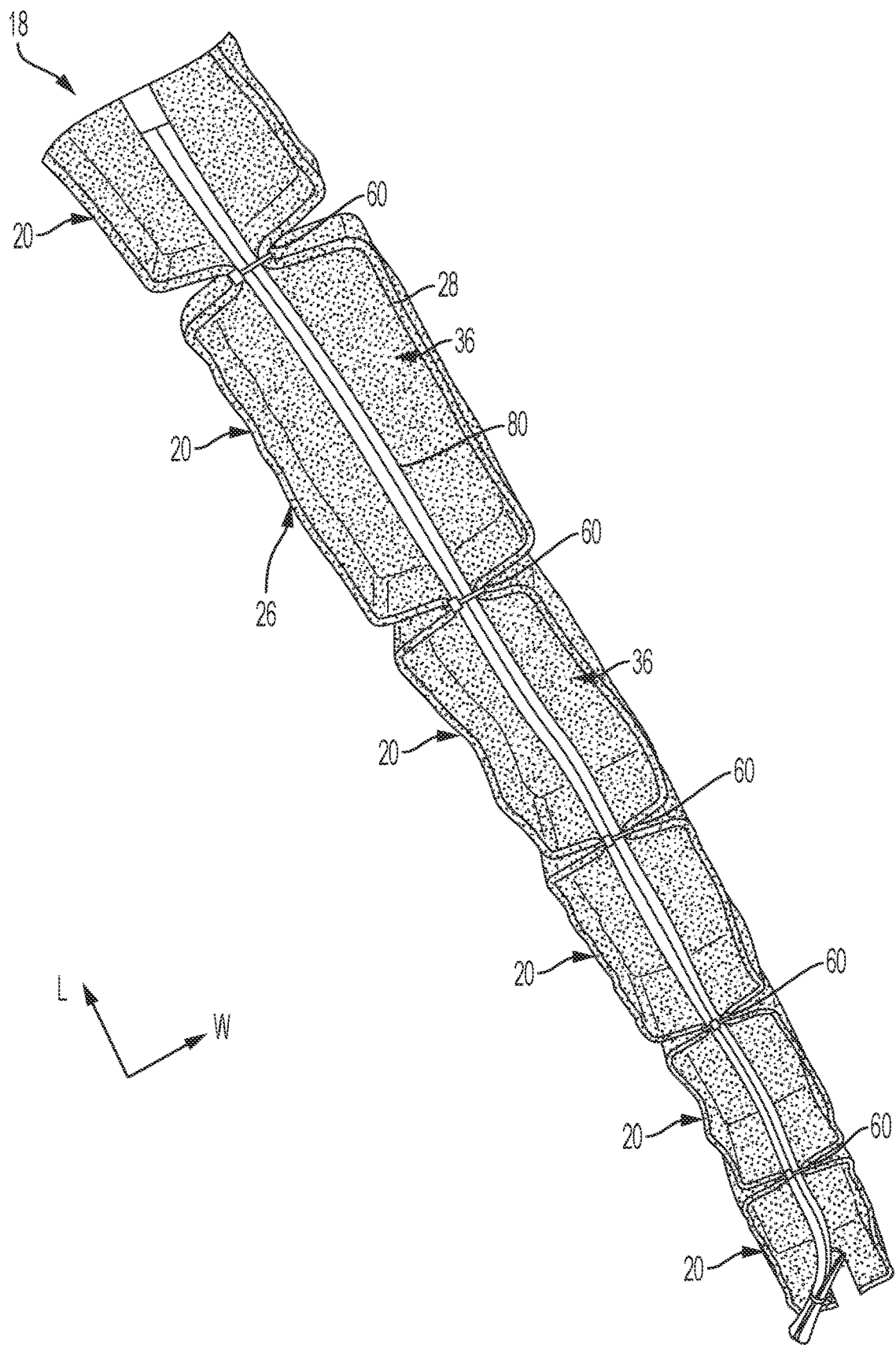
FIG. 10 is a bottom perspective view of a long section having a lighting strip.

As shown in the embodiment of FIG. 10, the long section 18 of the segments 10 of the landscape edging system 1 can have a lighting strip 80 disposed within the blocks 20. The lighting strip 80, for example, is a strip of LED lights in a flexible casing that can be attached within the blocks 20 and extend through the joints 60 of the long section 18 to illuminate the long section 18 from the interior space 36 of each of the blocks 20. In other embodiments, the lighting strip 80 can be applied within any of the blocks 20 of any of the segments 10 to illuminate the block 20 from the interior space 36.

The landscape edging system 1, as shown in FIGS. 1 and 11-14, is a connection of a plurality of the segments 10 described above into one of a plurality of different possible perimeter shapes P. The segments 10 are connected together by mating of the connector 40 of various ones of the segments 10 with the mating opening 50 of another one of the segments 10; although the different segments 10 each have particular names and types described above, the segments 10 may also be referred to generically as a first segment 10, a second segment 10, etc.

Figure 12:
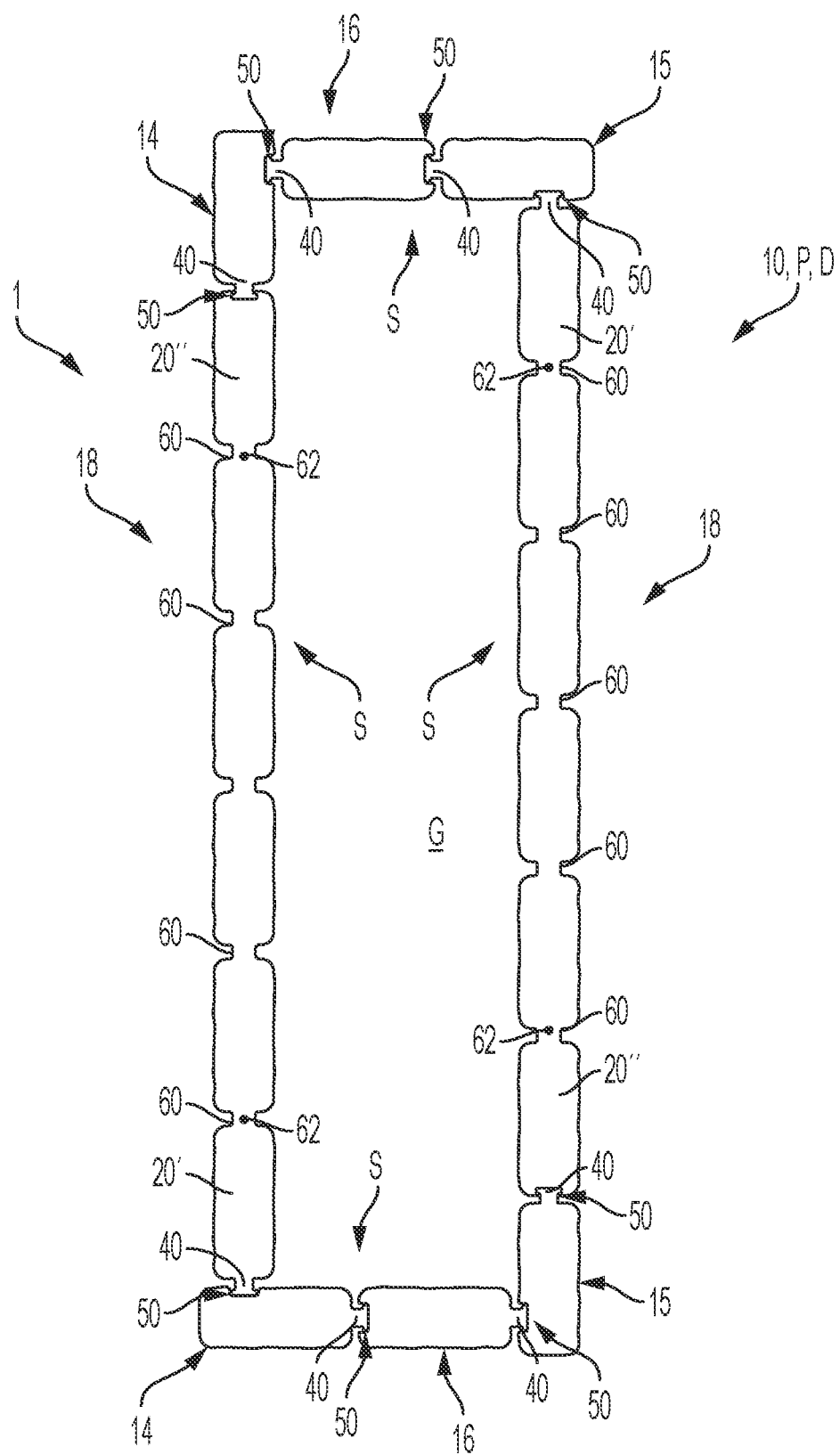
FIG. 12 is a top view of a landscape edging system according to another embodiment.

The connector 40 of a first segment 10, such as the right turn segment 14, the left turn segment 15, the extender segment 16, or the long section 18 shown in FIG. 12, is received in the mating opening 50 of a second segment 10, such as the right turn segment 14, the left turn segment 15, the extender segment 16, or the long section 18 shown in FIG. 12, to connect the first segment 10 and the second segment 10. The block 20 of the first segment 10 having the mating opening 50 is positioned over the block 20 of the second segment 10 having the connector 40 and the mating opening 50 is positioned over the connector 40. The tapered end 47 of the flange 44 enters the bottom recess 56 of the mating opening 50. As the block 20 having the mating opening 50 is moved down in the height direction H, the flange 44 is received in the bottom recess 56 and moves into the interior space 36 of the block 20. The connection segment 41 is received in the primary recess 52. The bottom width 58 of the bottom recess 56 is approximately equal to the flange width 46 of the flange 44 and the connection width 42 of the connection segment 41 is approximately equal to the primary width 54 of the primary recess 52. The connector 40 is received in the mating opening 50, with the flange 44 positioned at least partially in the interior space 36, to connect the first segment 10 and the second segment 10. The connection between the segments 10 formed by mating of the connector 40 and the mating opening 50 is removable.

Figure 11:
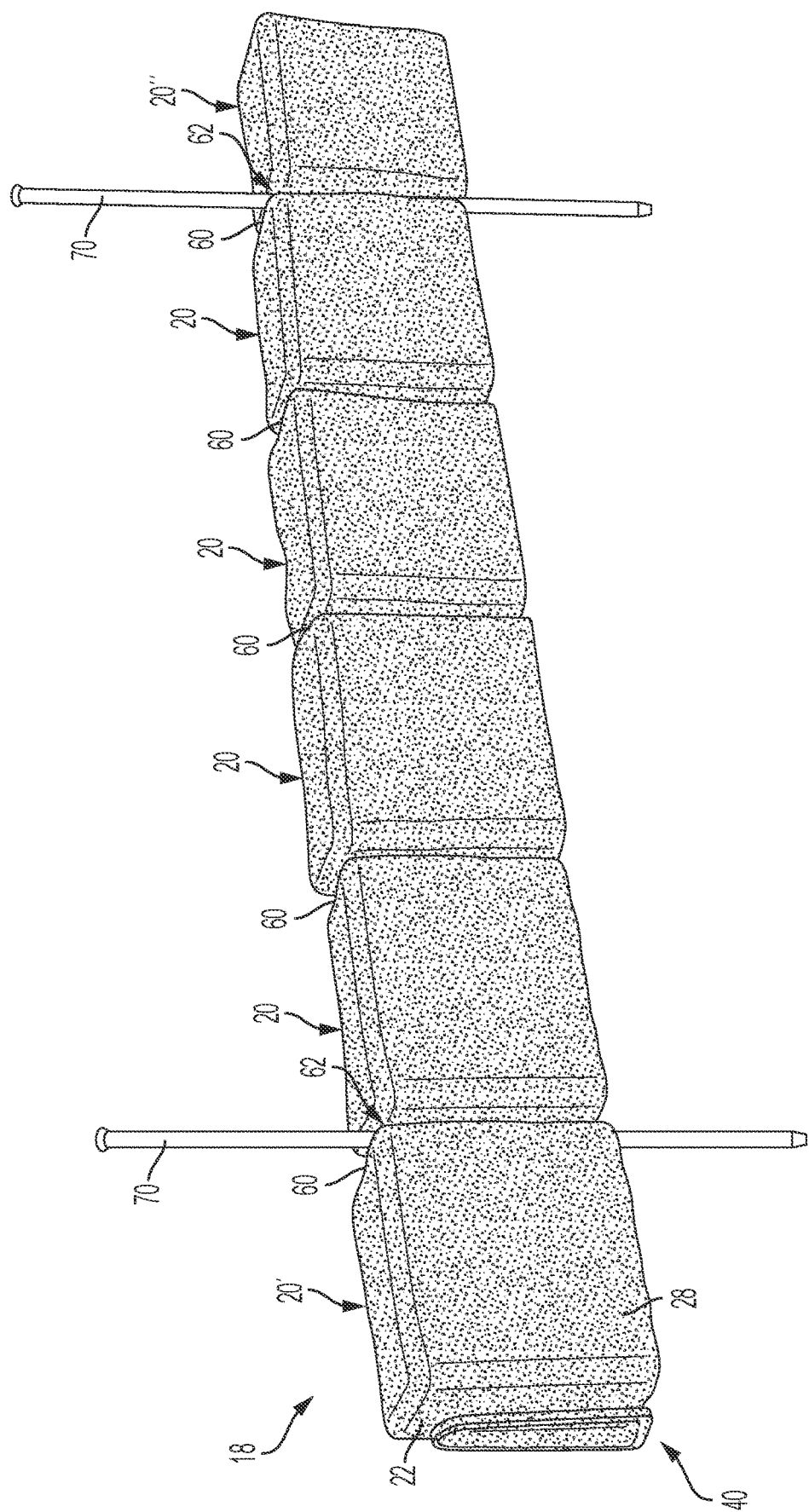
FIG. 11 is a perspective view of a long section with a pair of stakes.

The long sections 18 can be attached to the ground surface G by a plurality of stakes 70, shown in FIG. 11. The stakes 70 each extend through the passageway 62 of one of the joints 60 and can be hammered or otherwise forced into the ground surface G to fix the long section 18 on the ground surface G. The long section 18 can be fixed by the stakes 70 in a straight position or in a curved, bent position, as described in greater detail below. When the long section 18 is attached to other segments 10 by mating of the connectors 40 with the mating openings 50, fixing the long sections 18 to the ground surface G with the stakes 70 can also attach all of the segments 10 of the landscape edging system 1 to the ground surface G.

In the embodiment shown in FIG. 1, the landscape edging system 1 is formed from four long sections 18 and four right turn segments 14 to form a closed perimeter shape D having a plurality of straight portions S. The connectors 40 at the first end blocks 20' of each of the long sections 18, shown in FIGS. 7A and 7B, are connected in the mating opening 50 of one of the right turn segments 14, shown in FIG. 2A, and the connectors 40 of the right turn segments 14 are each connected in the mating opening 50 of the second end block 20" of one of the long sections 18 as described above. The mating of the long sections 18 with the right turn segments 14 allows the block 20 of the right turn segment 14 to extend approximately perpendicular to the blocks 20 of the long section 18. As described above, the stakes 70 can be used in the joints 60 of the long sections 18 to secure the landscape edging system 1 in the position shown in FIG. 1.

The landscape edging system 1 of the embodiment shown in FIG. 12 is formed from two long sections 18, two right turn segments 14, two left turn segments 15, and two extender segments 16 to form the perimeter shape P as a closed perimeter shape D having a plurality of straight portions S. In contract to the embodiment of FIG. 1, the closed perimeter shape D is a rectangle instead of a square, exemplifying another possible arrangement of the landscape edging system 1. In this embodiment, the mating of the right turn segment 14 and the extender segment 16 allows the block 20 of the right turn segment 14 to extend parallel to the block of the extender segment 16.

Figure 13:
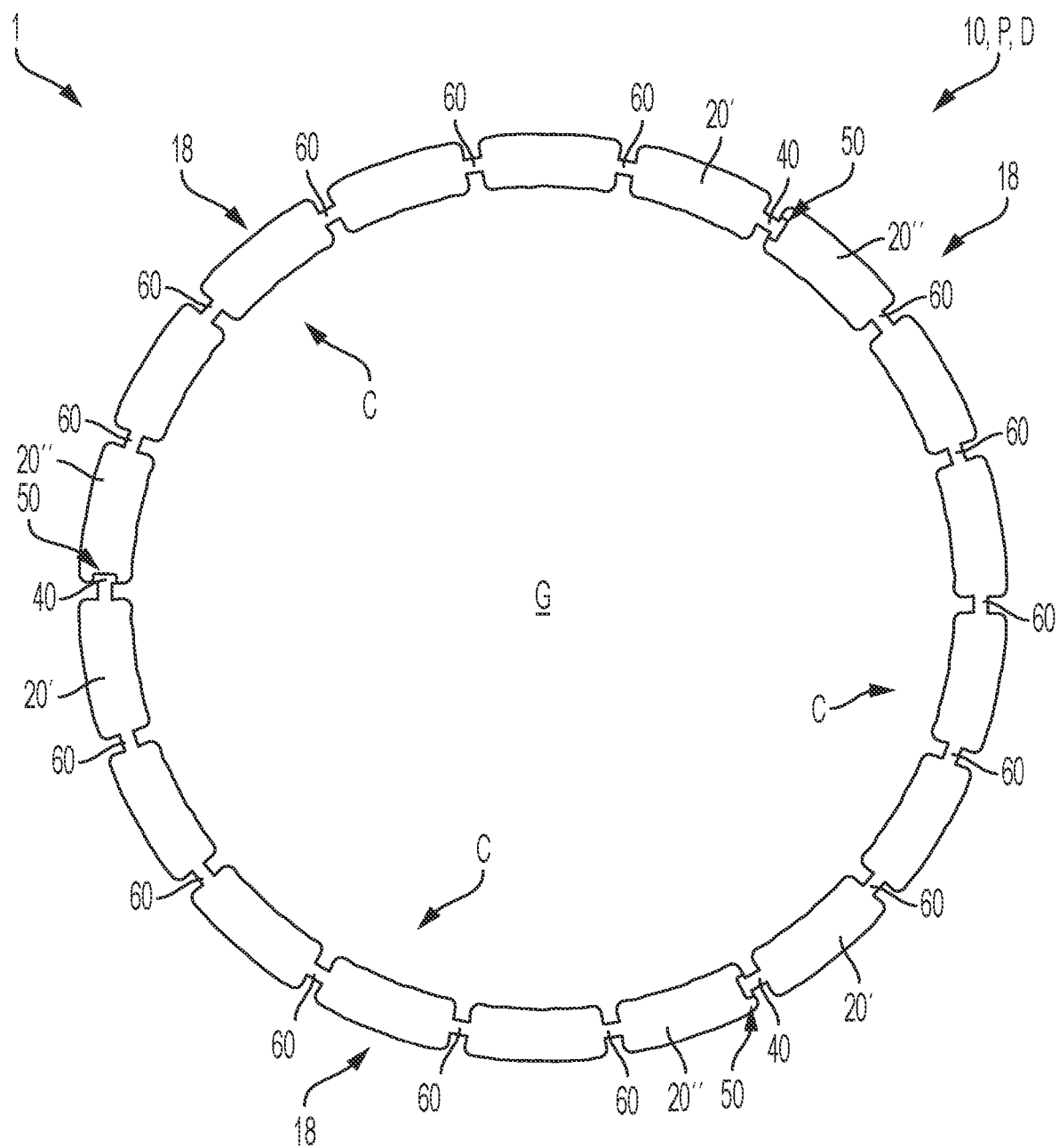
FIG. 13 is a top view of a landscape edging system according to another embodiment.
Figure 14:
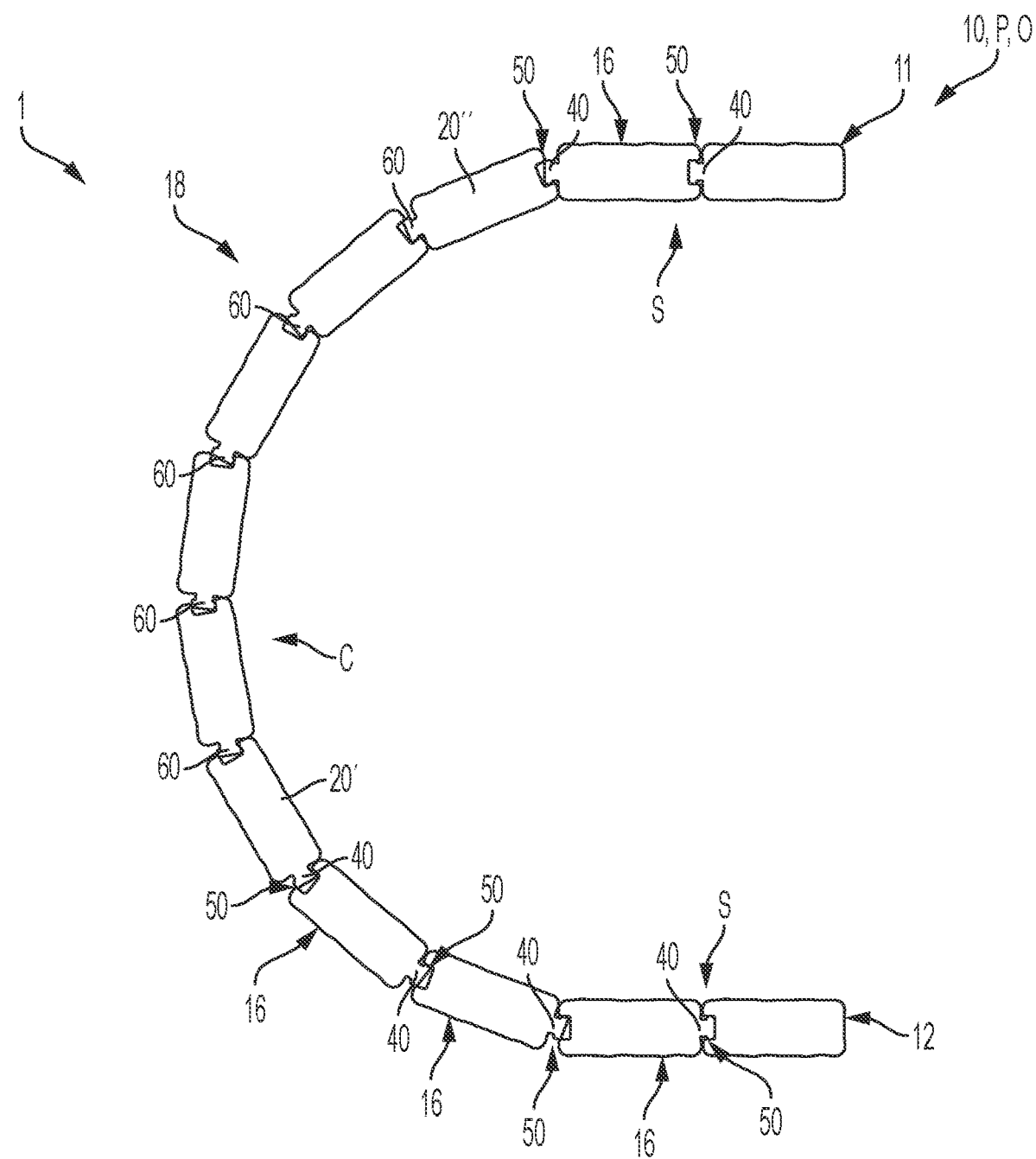
FIG. 14 is a top view of a landscape edging system according to another embodiment.

In FIG. 13, an embodiment of the landscape edging system 1 is shown in which three long sections 18 are schematically shown bent about the joints 60 and connected to form the perimeter shape P as a closed perimeter shape D having a plurality of curved portions C. In another embodiment shown in FIG. 14, the landscape edging system 1 has one long section 18 bent about the joints 60 and connected to four extender segments 15, a start segment 11, and an end segment 12 to form the perimeter shape P as an open perimeter shape O having both straight portions S and a curved portion C.

In various embodiments, the landscape edging system 1 can be connected from any number of segments 10 described above in any combination to form a perimeter shape P having all straight portions S, all curved portions C, or a mixture of straight portions S and curved portions C to form any open perimeter shape O or closed perimeter shape D that can be used, for example, to define an edge of a landscaping bed.

The landscape edging system 1 according to the present invention allows for easy connection of the segments 10 to form any number of perimeter shapes P to fit various bed edging applications. The lightweight, resilient material of the segments 10 allows for easy maneuverability, while the connection between the connectors 40 and the mating openings 50, along with the bendability of the long sections 18, allows for efficient and removable assembly of the segments 10 into the desired shape. The landscape edging system 1 allows for the formation of bed edging that resembles stone with significantly less time and effort than is required for traditional stone or brick materials.

What is claimed is:

1. A landscape edging system, comprising:
a first segment including at least one first block having a connector extending from an end face of the at least one first block, the connector has a connection segment and a flange at an end of the connection segment opposite the end face of the at least one first block, the at least one first block is one of a plurality of first blocks of the first segment, the first blocks are connected to one another by a plurality of joints, the plurality of first blocks and the plurality of joints are monolithically formed together to form the first segment in a single piece, the joints are flexible and the first blocks are elastically bendable with respect to one another about the joints; and
a second segment including at least one second block defining an interior space and having a mating opening extending through a side face or an end face of the at least one second block into the interior space, the connector is received in the mating opening and in the interior space to connect the first segment and the second segment.

2. The landscape edging system of claim 1, wherein the connection segment has a connection width and the flange has a flange width greater than the connection width.

3. The landscape edging system of claim 2, wherein the flange has a tapered end adjacent to an upper surface of the at least one first block.

4. The landscape edging system of claim 1, wherein the connector has a connection opening extending through the connection segment and the flange into an interior space of the at least one first block.

5. The landscape edging system of claim 1, wherein the mating opening includes a primary recess and a bottom recess communicating with the primary recess, the primary recess extends through the side face or the end face of the at least one second block, the bottom recess extends through a lower surface of the at least one second block.

6. The landscape edging system of claim 5, wherein the primary recess has a primary width and the bottom recess has a bottom width greater than the primary width.

7. The landscape edging system of claim 5, wherein the bottom recess receives the flange and the primary recess receives the connection segment.

8. The landscape edging system of claim 1, wherein one of the plurality of first blocks of the first segment has a mating opening identical to the mating opening of the at least one second block, the mating opening of the one of the plurality of first blocks extends through a side face of the one of the plurality of first blocks or an end face of the one of the plurality of first blocks opposite the end face having the connector.

9. The landscape edging system of claim 8, wherein the one of the plurality of first blocks extends approximately perpendicularly with respect to the at least one second block when the first segment is connected with the second segment.

10. The landscape edging system of claim 1, wherein the at least one first block extends parallel to the at least one second block when the first segment is connected with the second segment.

11. The landscape edging system of claim 1, wherein at least one of the joints has a passageway extending through the at least one joint and receiving a stake.

12. The landscape edging system of claim 1, wherein an end face of each of the first blocks connected to one of the joints has an angled surface angled away from the one of the joints.

13. The landscape edging system of claim 1, further comprising a lighting strip disposed within at least one of the first segment and the second segment.

14. The landscape edging system of claim 1, wherein the at least one first block and/or the at least one second block has an opening extending through an upper surface of the at least one first block and/or the at least one second block.

15. The landscape edging system of claim 1, wherein the first segment and the second segment are part of a plurality of segments that are connectable together to form a perimeter shape that is an open perimeter shape or a closed perimeter shape.

16. The landscape edging system of claim 15, wherein the perimeter shape has a plurality of straight portions or a plurality of curved portions.

17. The landscape edging system of claim 15, wherein the perimeter shape has at least one curved portion and at least one straight portion.

18. A landscape edging system, comprising:
a first segment including at least one first block having a first connector extending from an end face of the at least one first block, the first connector has a first connection segment and a first flange at an end of the connection segment opposite the end face of the at least one first block; and
a second segment including at least one second block defining an interior space and having a mating opening extending through a side face or an end face of the at least one second block into the interior space, the first connector is received in the mating opening and in the interior space to connect the first segment and the second segment, the at least one second block has a lower surface that is substantially solid and defines the interior space, the mating opening includes a primary recess and a bottom recess communicating with the primary recess, the primary recess extends through the side face or the end face of the at least one second block, the bottom recess extends through a portion of the lower surface of the at least one second block.

19. The landscape edging system of claim 18, wherein the second segment has a second connector extending from an end face of the at least one second block, the second connector has a second connection segment and a second flange at an end of the second connection segment opposite the end face of the at least one second block.

20. The landscape edging system of claim 19, wherein the second connector has a connection opening extending through the second connection segment and the second flange into the interior space of the at least one second block.

* * * * *